United States Patent [19]

Lynn et al.

[11] 4,055,369
[45] Oct. 25, 1977

[54] SEAL FOR A SPHERICAL BEARING

[75] Inventors: William Fred Lynn; Gordon Marvin Walker, both of Renton, Wash.

[73] Assignee: The Boeing Company, Seattle, Wash.

[21] Appl. No.: 576,491

[22] Filed: May 12, 1975

[51] Int. Cl.$^2$ .................. F16C 33/72; F16C 33/74
[52] U.S. Cl. .................. 308/187.1; 277/89; 277/188 R; 308/72
[58] Field of Search .............. 308/72, 237 R, 237 A, 308/239, 187.1, 187.2; 277/3, 89, 91, 93 R, 188 R

[56] References Cited

U.S. PATENT DOCUMENTS

| 2,277,810 | 3/1942  | Zotter    | 308/187.2 |
| 2,753,225 | 7/1956  | Gilmer    | 308/72    |
| 2,814,538 | 11/1957 | Connolly  | 308/72    |
| 3,044,787 | 7/1962  | Derman    | 277/83    |
| 3,330,607 | 7/1967  | Delp      | 308/187.2 |
| 3,428,375 | 2/1969  | Martin    | 308/187.2 |
| 3,838,898 | 10/1974 | Bird      | 308/187.2 |
| 3,848,938 | 11/1974 | Stella et al. | 308/36.1 |
| 3,869,181 | 3/1975  | Barber    | 308/187.2 |
| 3,947,077 | 3/1976  | Berg et al. | 308/187.1 |

*Primary Examiner*—Richard A. Bertsch
*Attorney, Agent, or Firm*—Morris A. Case; Bernard A. Donahue

[57] ABSTRACT

A ring fastened to the side of an outer race of a spherical bearing flexibly extends outward to contain a resilient material in the space between contacting corners of the inner and outer races and the ring.

8 Claims, 7 Drawing Figures

SEAL FOR A SPHERICAL BEARING

BACKGROUND OF THE INVENTION

Self-aligning spherical bearings with the bearing surface of a fabric lining such as teflon (polytetrafluoroethylene) are used extensively for service requiring a high load factor, at low r.p.m.'s. These bearings are particularly attractive as having freedom from periodic lubrication, high load capacity, self-aligning capability, and freedom from catastrophic failure modes such as seizure. These types of bearings have long service life under heavy loads. However, if the bearing is exposed to contaminants such as hydraulic fluid, anti-icing fluid, or abrasive solids, the service life of the bearing may be greatly reduced. Various types of seals are being used to attempt to seal out contaminants. In Schmidt, U.S. Pat. No. 3,558,201, the outer race is modified to have an inwardly directed annular groove near each side to retain a composite sealing ring of a metal ring encased in an elastomeric rubber to extend between and seal off the area between races. In Connolly, U.S. Pat. No. 2,814,538, a thin ring of nylon is deflectively extended between the two races and is held in place with snap rings seated in annular grooves in the outer race. A sealing device was discovered that effectively seals conventional spherical bearings.

SUMMARY OF THE INVENTION

A metal ring with an inside diameter about the same as the average outside diameter of the exposed part of a bearing inner race is rigidly fastened to the side of the outer race. An enclosed annular void is created, bounded by the inner face of the metal ring, the side face of the outer ring, and the spherical surface of the inner ring. At the point of juncture between the two races the side of the outer race is chamfered to create a recess. The ring is deflected outward near its inner diameter to define a space behind the deflected ring, bounded by the side of the outer race and the spherical surface of the inner race.

The space behind the deflected ring is filled with a resilient material such as, but not limited to, a silicone rubber.

It is an object of this invention to increase service life of spherical bearings operating in conditions subject to contamination.

It is another object of this invention to seal contaminants out of a spherical bearing.

It is yet another object of this invention to seal in debris from the lining of a spherical bearing.

DETAILED DESCRIPTION

Figure 1:
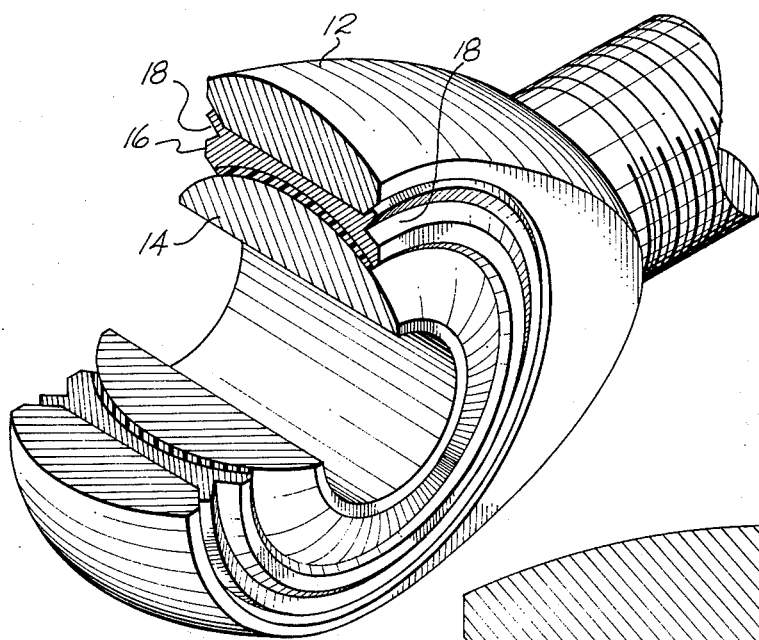
FIG. 1 shows a perspective view partially in section of a spherical bearing mounted in a rod end housing.
Figure 2:
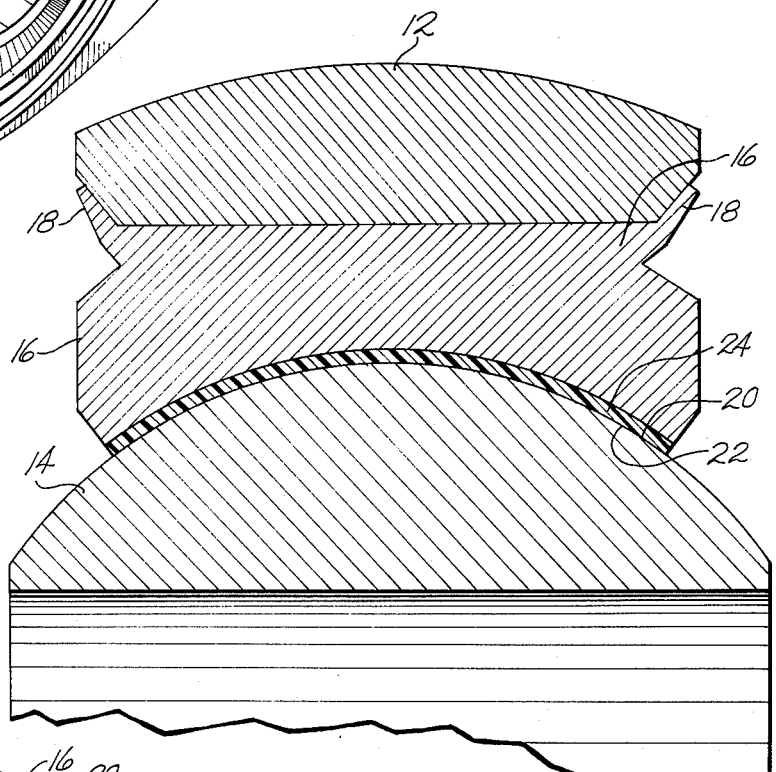
FIG. 2 shows a partial blown up sectional view of the bearing of FIG. 1.

In FIGS. 1 and 2, a spherical bearing 10 is mounted inside a housing 12. The bearing has an inner race 14 and an outer race 16. In this configuration, the outer race has a staking groove 18 along each side; however, this groove may or may not be present, but is shown to illustrate this invention may be practiced in all conventional spherical bearings including those having a staking groove. The outer surface 20 of the inner race is spherical in shape, and matches the inner surface 22 of the outer race. This surface is covered with a bearing material 24 which acts as a liner and is tightly adherent to the outer race. The bearing material may be any material such as babbit, or bronze, but preferably is polytetrafluoroethylene, otherwise known as TFE. The liner is preferably a TFE fabric filled and bonded to the outer race with an adhesive resin.

Figure 3:
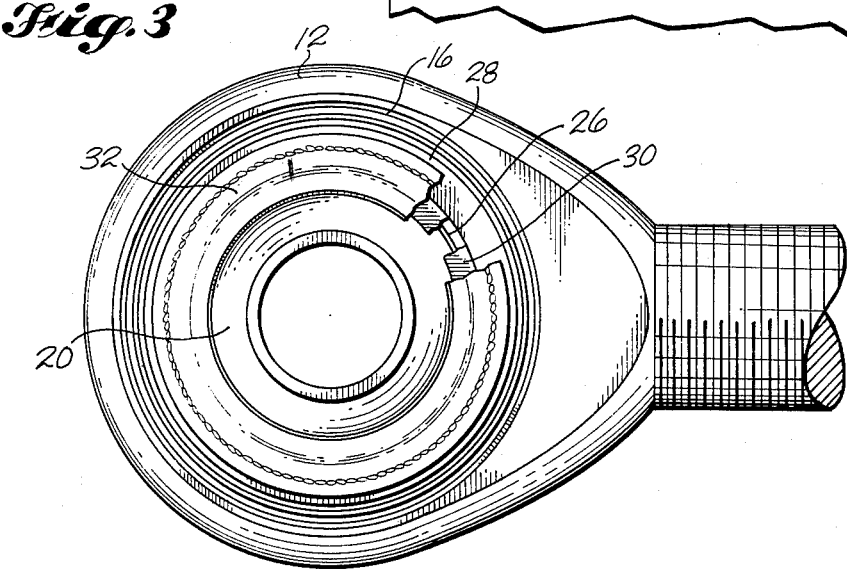
FIG. 3 shows a side elevational view of the bearing of FIG. 1 with a seal, partially cut away, as practiced by this invention.
Figure 4:
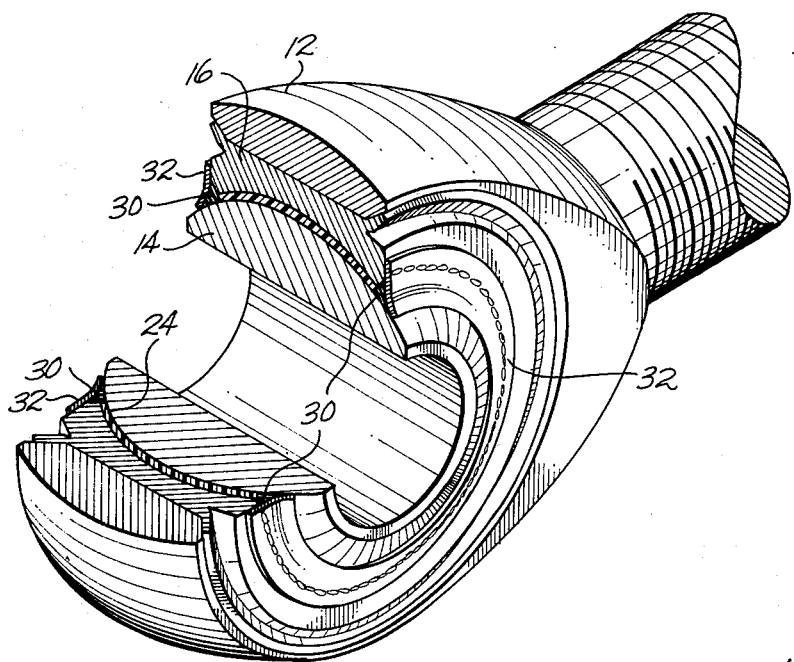
FIG. 4 shows a perspective view partially in section of a sealed bearing.
Figure 5:
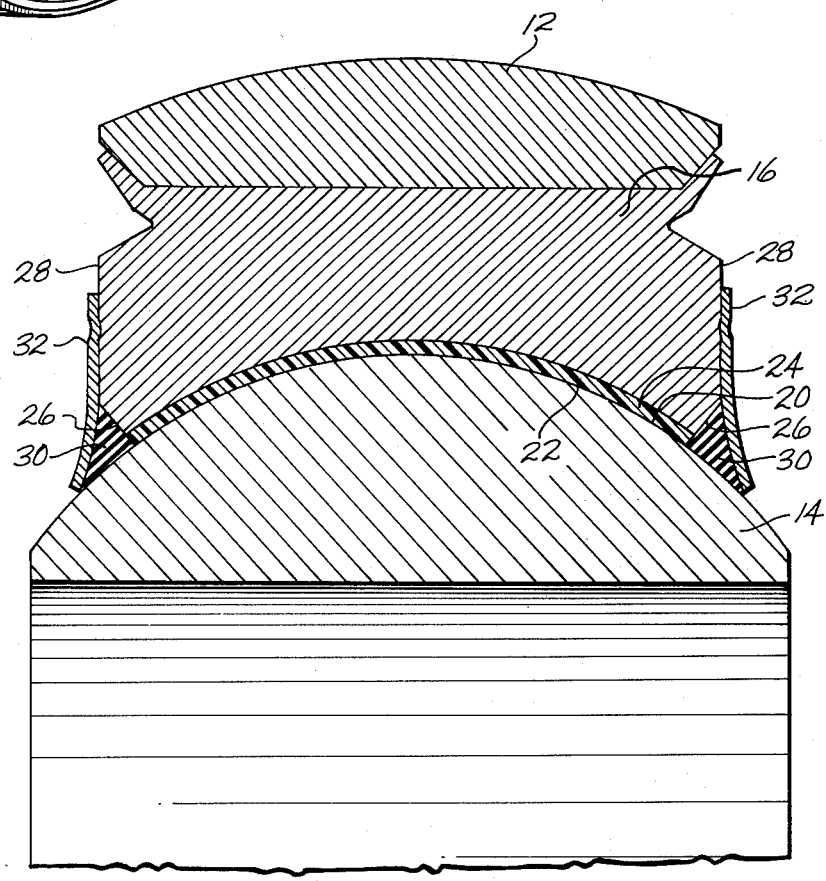
FIG. 5 is a blown up sectional view of the sealed bearing of FIG. 4.

FIGS. 3, 4, and 5 show the same bearing with the seals of this invention in place. The same numbers, therefore, will be shown for identical parts in the sealed and the unsealed bearings.

A chamfer 26 is located along each side 28 of the outer race at the juncture between the two spherical surfaces. This chamfer creates a pocket into which a resilient sealing material 30 is urged by retaining ring 32. The retaining ring is rigidly held against the sides of the outer race and extends to the inner race spherical surface 20. The inner diameter of the ring is sized to approximate the average diameter of the exposed part of the inner race. Thus, the ring extends about half way down the outer surface 20, and the ring is bowed out near its inner diameter. The resilient sealing material is held behind the bowed ring, is continually pressed into the pocket or recess between the chamfered part of the outer race and the outer diameter of the inner race. It is believed this seal is effective by not only keeping contaminants away from the bearing surface, but also slows the loss of debris from the wearing of self-lubricating lined bearings or keeps the lubricant in on the lubricated type of spherical bearing. In a self-aligning bearing the depth of the ring is preferably sized to extend inward as far as possible and still allow about 5° of misalignment of the bearing. To install the seal it is preferable to place resilient seal material against a side of the ring near its inside diameter, to press the ring near its outer diameter against the side of the outer race and attach the ring in place, preferably by spot welding.

A spherical bearing lined with TFE is found to operate well under heavy loads, is self-lubricating, and has a long wear life under conditions where it is free from contaminants. When subjected to contaminants its wear life may be greatly reduced.

Cycles of oscillation versus wear tests were performed using various materials that might cause contamination when a bearing is used in aircraft service.

Figure 6:
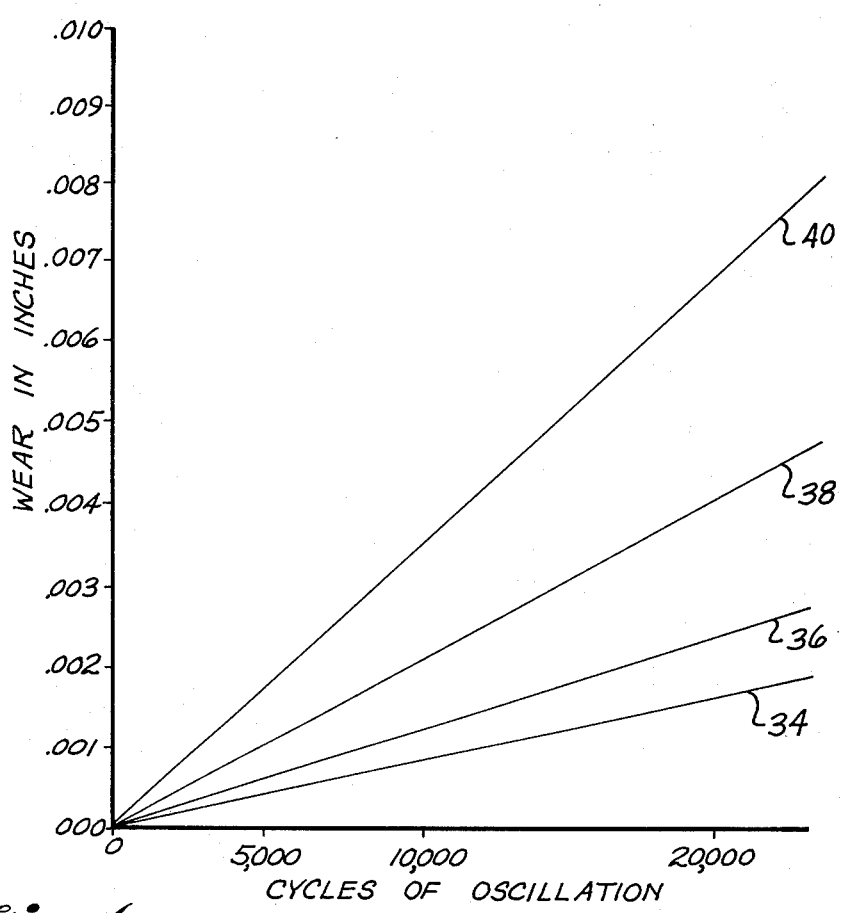
FIG. 6 shows a graph depicting wear of a spherical bearing.

FIG. 6 shows the results of some of the tests perfomed on bearings without the use of a seal. The tests shown by line 34 were free of contaminants. All the other tests were performed while exposed to various contaminants. Tests shown by line 36 were exposed to a mixture of silica flour, aircraft cleaner, water, anti-icer, hydraulic fluid and kerosene; tests shown by line 38 were exposed to hydraulic fluid, and tests shown by line 40 were exposed to an anti-icer of ethylene glycol and alcohol.

Test conditions were all performed under a load of 16,650 p.s.i., with an oscillation of ±20°, and a cycle rate of 100 cycles per minute.

Figure 7:
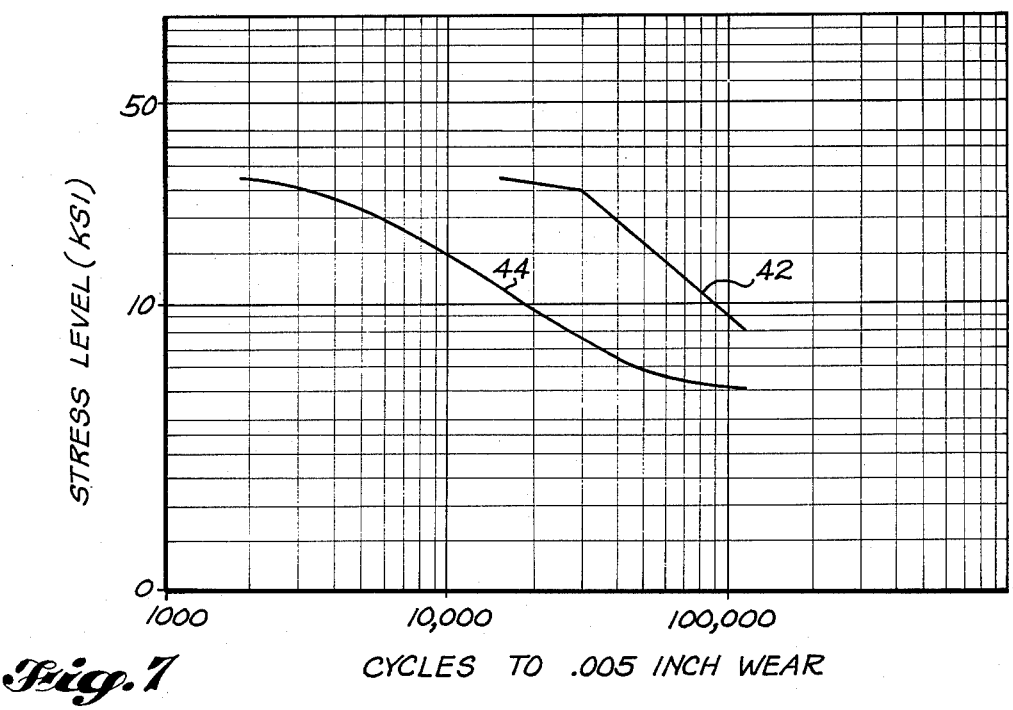
FIG. 7 is a graph showing stress life comparison of a sealed and an unsealed spherical bearing.

Additional tests were performed to determine the load life of TFE lined spherical bearings with the seal of this invention and without any seal when exposed to an anti-icing contaminant during the test. Test conditions called for ±20° oscillation at 100 cycles per minute. The load was varied and the number of cycles determined at the point where the bearing liner experienced a wear of 0.005 inches. The results of those tests are shown in FIG. 7. That graph shows the sealed bearings as represented by line 42 were far superior to unsealed bearings as represented by line 44.

We claim:

1. A seal for a lined spherical bearing comprising: a ring fastened to a side of an outer race of a spherical bearing having an inner diameter of the ring deflected outward against a spherical outer surface of an inner race of the bearing; and a resilient material located to fill a space behind the deflected part of the ring.

2. A seal for a lined shperical bearing as in claim 1 wherein the ring is welded to the side of the outer race.

3. A seal for a lined spherical bearing as in claim 2 wherein the ring is metal and the resilient material is silicone.

4. A seal for a lined bearing having a spherical surface between an inner and an outer race comprising: a chamfer along each side wall of the outer race, said chamfer located at the juncture of the two races; a ring located to extend from a side of the outer race to the spherical surface of the inner race, said ring welded to the outer race and flexibly bowed outward to the inner race to form an annular pocket between the ring and the races; and a resilient material to fill and to be continually pressed into the pocket.

5. A seal for a lined bearing as in claim 4 wherein the ring is metal and the resilient material is silicone.

6. A seal for a self-aligning bearing having matching spherical surfaces between an inner and an outer race comprising: a ring to extend from the spherical surface of the inner race to a side of the outer race, said ring rigidly attached to the side of the outer race and of a depth to bow outward toward ring inner diameter and to permit about 5 degree misalignment of the bearing; a chamfer located on the side of the outer race and under the ring; and a resilient sealing material filling the space therebetween.

7. A seal for a self-aligning bearing as in claim 6 wherein the ring is metal and is welded to the side of the outer race.

8. A method of sealing self-aligning lined spherical bearings having a recess in a side wall of an outer race at a juncture with an inner race, the steps comprising: preparing a ring having an inside diameter about the same as an outside diameter at a midpoint of an exposed part of the inside race, placing a resilient material near the inside diameter of the ring, pressing the ring against the side of the outer race bowing out the ring and forcing the resilient material into space between the races and the bowed ring, and welding the ring against the side of the outer race.

* * * * *